J. Hanford.

Granulating & Drying Sugar.

No 3501. Reissued Jun 8. 1869.

Witnesses:

Samuel C. Piper.

George Andrews

Inventor:

Jesse Hanford by his attorney

R. Mc Eldy

UNITED STATES PATENT OFFICE.

JESSE HANFORD, OF LEXINGTON, MASSACHUSETTS.

IMPROVED MACHINE FOR GRANULATING AND DRYING SUGAR.

Specification forming part of Letters Patent No. 58,098, dated September 18, 1866; Reissue No. 3,501, dated June 8, 1869.

*To all whom it may concern:*

Be it known that I, JESSE HANFORD, residing in Lexington, in the State of Massachusetts, have made a new and useful Invention for Granulating and Drying Sugar, such invention being applicable to other useful purposes — such as granulating and drying salt or drying grain; and I do hereby declare the same to be fully described in the following specification and represented in the accompanying drawings, of which—

Figure 1:
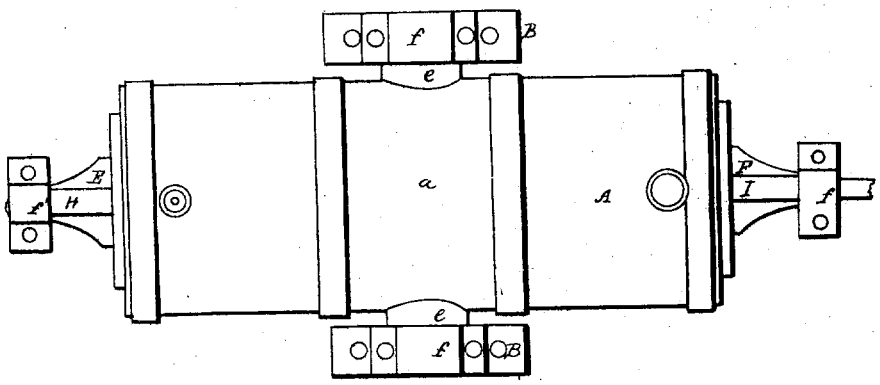
Figure 2:
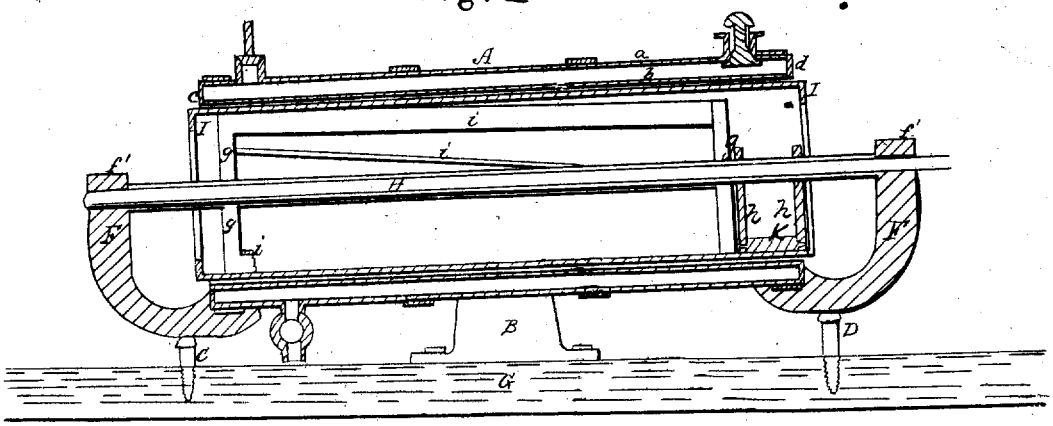

Figure 1 is a top view, and Fig. 2 a longitudinal section, of it.

In such drawings, A denotes a tubular heater composed of two concentric cylinders, *a b*, united at their ends by annular heads *c d*. Journals *e e*, projecting from the middle of the outer surface of the said heater and supported in boxes *f f*, upheld by two standards, B B, the same being so that the heater may be inclined more or less to the horizon, its inclination being determined by two wedges, or, what is the same, by screws C D, arranged underneath and against two curved arms, E F, projecting from opposite ends of the heater, in manner as represented in Figs. 1 and 2. The standards B B and the screws C D rest on a bed-plate, G. The arms E F are formed with boxes *f f*, for supporting a shaft, H, which extends through the axis of the heater, and is connected with a tubular cylinder, I, by means of two series of radial arms, *g g*. The said cylinder I is arranged with the heater and with the internal curved surface of the latter nearly in contact with the external curved surface of the cylinder. There is suspended from the shaft, by means of two arms, *h h*, applied so as to turn freely on it, a pulverizing or granulating roller, K, it being arranged near the induction end of the cylinder. Furthermore, there is within the cylinder, and affixed to its arms, a series of helical wings, *i i*, which, while the cylinder may be in revolution, aid in causing the sugar or other material which may enter it at its induction end to flow or move toward and out of the eduction end. By increasing the inclination of the heater the velocity of movement of the material through the cylinder may be increased.

The heater is intended to receive steam or heated air for imparting heat to it, and for this purpose may have a pipe leading into it from a steam-generator or an air-heater, and such pipe may enter it through the axis of one of the journals of the heater, and, for the purpose of discharging the water produced by condensation of steam, there may be a stop-cock at the lower part of the heater. On revolving the cylinder by putting the shaft in quick revolution and pouring sugar in a lumpy and wet or moist state into the receiving end of the cylinder, such sugar will be crushed or broken up by the roller, and will be caused to move around on and through the cylinder in a manner to be granulated and dried in case the cylinder is heated by the heater supplied with steam or hot air.

When the apparatus is to be used for drying grain or substances not requiring to be granulated or pulverized, the crushing-roller should or may be previously removed from the cylinder.

The outer steam-drum may be dispensed with and a current of hot air forced through the inner one.

I claim as my invention the following, viz:

1. The employment of a revolving cylinder provided with the helical wings or their equivalent devices, for elevating the sugar or other substance and allowing it to be precipitated to the bottom of such cylinder, and also with a suitable means of drying said sugar or substances.

2. The combination of the hollow rotary drum or cylinder I and the tubular heater, arranged and connected substantially as described.

3. The combination of the rotary or hollow cylinder I, the crushing-roller K, and the tubular heater, arranged and applied together substantially in manner and so as to operate as and for the purpose described.

4. The combination of the journals *e e* and their supporting-standards B B of the tubular heater with such heater and the rotary cylinder, or the same and the crushing-roller, applied and arranged together, substantially as specified.

5. The combination and arrangement of the series of helical wings *i i*, with the cylinder and heater applied in manner and so as to operate as specified.

JESSE HANFORD.

Witnesses:

EDWARD GRIFFITH,
FRANK FULLER.